June 7, 1966 R. W. HAVENS 3,254,981
POROUS METAL MOLD FOR MOLDING GLASS ARTICLES
Original Filed Sept. 16, 1957 2 Sheets-Sheet 1
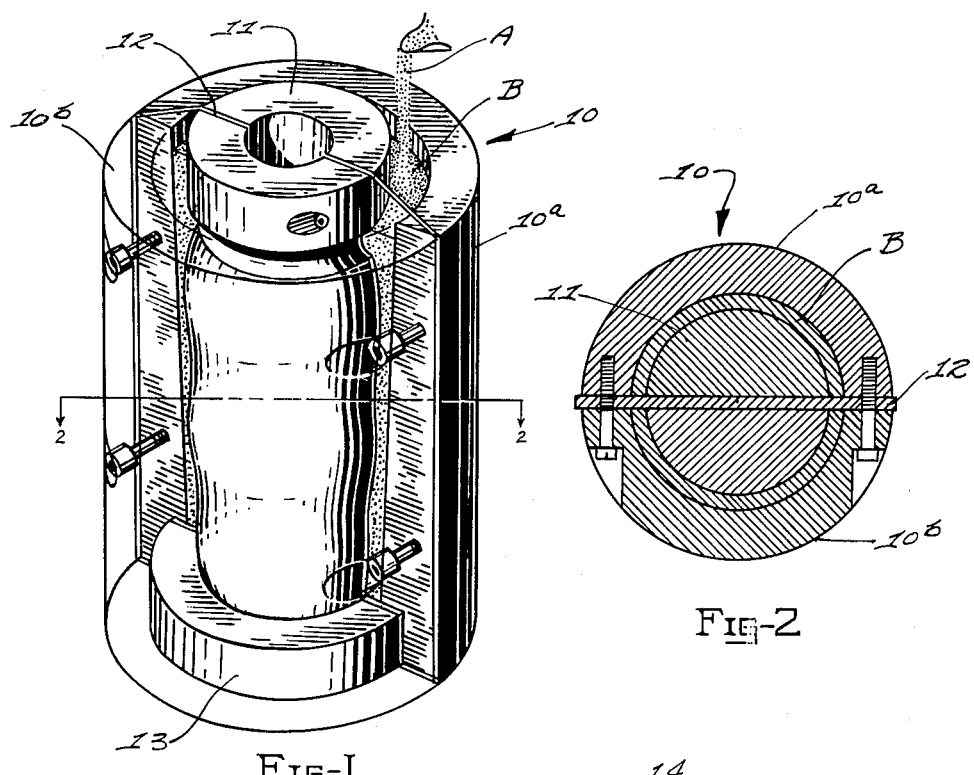
Fig-1
Fig-2
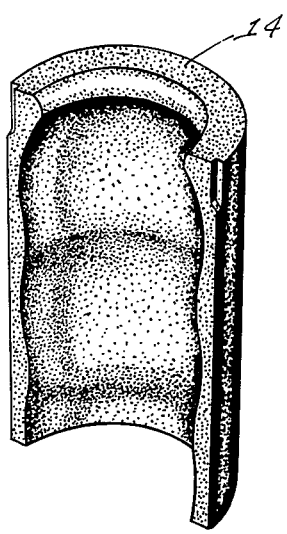
Fig-3
INVENTOR
ROBERT W. HAVENS
BY
ATTORNEY

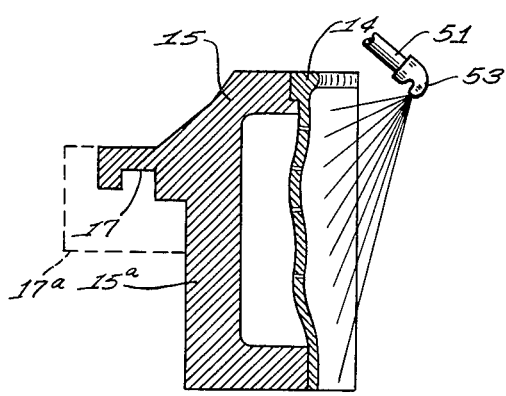
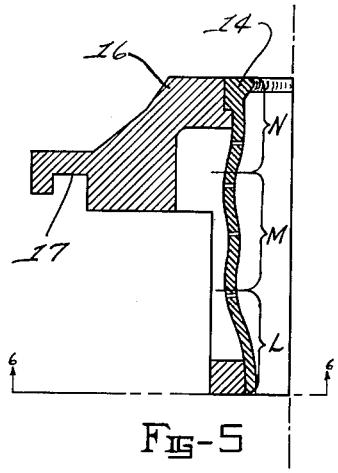
Fig-4
Fig-5
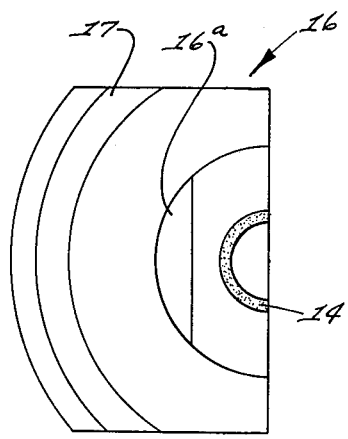
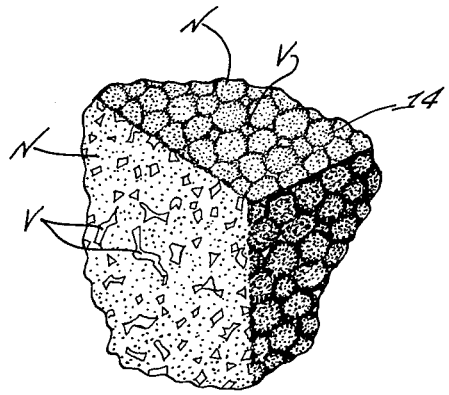
Fig-6
Fig-7
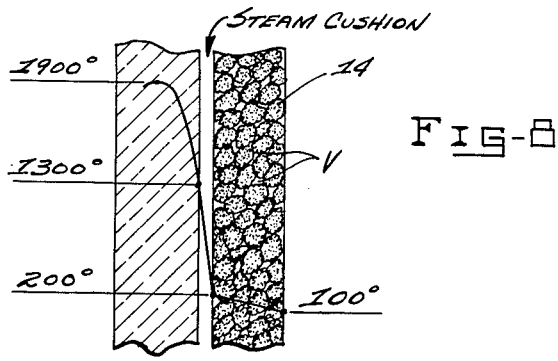
Fig-8

United States Patent Office 3,254,981
Patented June 7, 1966

1

3,254,981
POROUS METAL MOLD FOR MOLDING GLASS ARTICLES
Robert W. Havens, Toledo, Ohio, assignor to Owens-Illinois Inc., a corporation of Ohio
Continuation of abandoned application Ser. No. 684,029, Sept. 16, 1957. This application Sept. 17, 1962, Ser. No. 228,212
3 Claims. (Cl. 65—359)

This application is a continuation of Ser. No. 684,029 filed Sept. 16, 1957, now abandoned.

This invention presents a new concept in molds for forming glassware and other glass articles by what is generally known as the "paste mold process."

Although this invention illustrates primarily mold structure for blow forming parisons of glass into articles of glassware, it is contemplated that its teaching will lend itself to other forms of glass shaping tools for forming various articles of glass, such as by pressing, etc.

Heretofore, the paste mold process of forming glassware involves the principle of coating the molding cavity of a partible mold with a cork-graphite paste which, when applied and processed, has ability to absorb a limited quantity of water. In operation, water is applied to this paste composition surface and absorbed therein just prior to the introduction of a glass parison in workable form as transferred from a blank mold where it was shaped from a measured quantity of fed molten glass.

Upon closing the paste mold about this parison of workable glass, the heat radiated from it converts the water absorbed by the paste composition to steam, which forms a steam cushion between the paste surface of the mold and the glass parison.

This parison has an upper holding portion formed in a neck ring by which the parison is transferred from the blank mold to the paste molding station. At the paste mold station, the holding portion of the parison is gripped by parison rotating mechanism, and upon closing the paste mold the parison is continuously rotated until the finished shape of the article is blow formed and paste mold is again opened. One form of such apparatus is more fully disclosed in U.S. Patent No. 2,744,358, to George E. Rowe.

By rotating the parison during blow forming, and by providing the steam cushion between parison and mold cavity surface, the article of glassware, when finished, will be formed without mold seams or similar marks being present.

This process is most widely practiced in the glass industry for forming glass tableware.

Recognized disadvantages of the paste lined molds used heretofore are their short operating life and their limited ability to absorb sufficient quantities of water for supplying adequate quantities of steam to maintain the steam cushion during the blow forming cycle. Also, the equipment and material necessary to recondition or repaste worn paste molds is very costly and time consuming.

Accordingly, it is an object of the present invention to provide glass shaping tools for use in the paste mold forming process which are fabricated of porous metal and have the resultant advantages of the greatly increased mold life and decreased cost of maintenance.

Another object of the invention is to provide glass shaping tools for use in the paste mold forming process

2 that are easily and economically manufactured in quantities and with increased uniformity one to the other, as compared to the paste molds heretofore produced.

Another object of the present invention is to provide molds for use is the paste mold forming process which are capable of increased porosity and increased water absorption properties over the paste mold compositions presently available.

A further object of the invention is to provide molds for use in the paste mold forming process which have a molding cavity defined by walls of porous metal, wherein the porosity and related water absorption is varied along the axial dimensions of the mold.

Another object of the invention is to provide a method of molding and finishing glass articles on a molding surface portion having different degrees of porosity which are arranged over a described pattern to cause extraction of heat from the glass undergoing molding in varying amounts and at the different areas opposite the molding surface corresponding to said pattern.

Other objects and advantages will become apparent from the drawings, as taken in conjunction with the following description.

On the drawings:

FIG. 1 is a perspective view of a pattern mold for forming the porous mold body of the mold of this invention;

FIG. 2 is a sectional plan view taken at the line 2—2 of FIG. 1;

FIG. 3 is a perspective view of a complementary half of a formed mold body of a partible mold according to the invention;

FIG. 4 is a sectional elevational view of the mold body half shown in FIG. 3 mounted on one form of mold carrier or mold arm;

FIG. 5 is a sectional elevational view showing a second form of mold carrier mounting the mold body half of FIG. 3;

FIG. 6 is a bottom view, taken along line 6—6 of FIG. 5;

FIG. 7 is a perspective view of a sectional portion of the porous metal mold body of FIG. 3, as viewed under a microscope, and is magnified at approximately 75 diameter magnifications of the metal nodules comprising the porous metal and illustrating the net-work of voids interposed through the porous metal body; and FIG. 8 is a schematic view in form of a chart, illustrating the approximate temperature gradient curve present in the mold of this invention during which time a workable parison of glass is introduced into the mold for shaping.

Broadly considered, this invention contemplates glass shaping tools for forming articles of glassware to finished shape utilizing the paste mold process, an example of which is a pair of complementary mold halves of a partible finishing mold, wherein a glass parison is blow formed to the ultimate shape of glassware article. With occasional reference to the figures, the fabrication of the mold body will now be described.

In FIG. 1, a pattern mold 10 is provided for forming both complementary halves of the mold body simultaneously. The pattern mold 10 has a cavity defining the exterior surface of the finished mold body 14 (shown on FIG. 3) into which a core 11 is placed to define the configuration of the molding cavity of the finished mold body.

The pattern mold is in two semi-circular sections 10a and 10b, and when assembled in juxtaposition, is divided centrally by a thin plate divider 12.

On the drawing, the pattern mold half 10b is shown as outlined in phantom line to permit viewing the interior construction of the pattern mold 10 on the drawing. Both mold halves 10a and 10b are constructed of like material, for example, steel or cast iron. The halves 10a and 10b of the pattern mold 10 fit around an annular bottom ring 13, which is centrally bored to accommodate the insertion of core 11.

The porous mold body is formed of nodules of powdered metal, one example being nodules of copper coated with a layer of tin. This material is known in the metallurgy trade as a bronze metal filter powder, comprised of copper coated with tin in a ratio of approximately 90% copper to 10% tin.

The powdered metal is formed in nodular shaped particles having a central copper core and an exterior layer of tin. The nodules are substantially spherical in shape. Their size may vary widely, but the mesh size of nodule will determine the ultimate porosity of the metal article that is fabricated. It has been found that the satisfacory sizes to give the porosity advantageous to paste mold forming of glass is a powdered metal having nodule sizes ranging from 60 mesh up to 150 mesh. This would include nodules that pass through a 60 mesh screen, but will not pass through a 150 mesh screen. Such screens would have from 60 to 150 openings per linear inch. In the trade, these sizes are frequently referred to as minus 60 mesh to a minus 150 mesh size of powdered metal.

The powdered metal A, above described, is poured into the molding cavity B of the pattern mold 10 and compacted around the core 11. The filled pattern mold is struck at the desired elevation to define the top surface of the molded article. At the time of filling the pattern mold, the metal powder A may be at substantially room temperature. It is helpful, although not necessary, to vibrate the pattern mold 10 during filling to distribute and fill the cavity uniformly (such vibrator apparatus is not shown on the drawings). The filled pattern mold 10 is then transferred to a furnace which is maintained at a reducing atmosphere. I prefer to use a reducing furnace atmosphere of endothermic gas at 1 lb. back pressure. The reducing atmosphere is essentially for preventing oxidation of the powdered metal constituents, so as to obtain a homogeneous fusion and even porosity of the formed article. The temperature maintained with the furnace may vary in a range between 1050° F. and 1825° F. The sintering time in the furnace may be varied to give varying results in shrinkage and porosity of the formed article. I prefer to use a sintering time of between 20 and 30 minutes. If sintered at this timed duration, the temperature, if within the range of 1050° F. and 1250° F., will produce an article that is weak and has little ductility. Above 1250° F. the strength and polishing characteristic of the article improve until the more desirable results are obtained at 1560° F., which is the sintering temperature which I prefer to use.

After the sintering has been completed, the pattern mold 10 and its formed article are removed to a cooling zone. The cooling may be conducted in either a reducing atmosphere or in the air. The article is normally cooled, as distinguished from quenched cooling. Oxidation occurring during cooling is immaterial.

After cooling, the pattern mold 10 is removed from the cooled article, leaving the finished mold body halves 14, one of which is shown in FIG. 3. These mold body halves 14, when placed in juxtaposition, form the side walls of a molding cavity defining the contour of the outer side walls of the finished glassware article to be molded.

With reference to FIG. 4, the formed mold body halves 14 are mounted on their corresponding mold carriages 15, which are operatively connected with mold carrier arms 17a (shown in phantom outline) of a conventional forming machine at semi-circular bracket 17. The carriage arms are pivoted for rotation in either direction counter to each other for opening and closing the mold bodies 14 during operating cycles of the machine.

During the operation cycle of the machine, a parison is shaped from molten glass fed to a blank mold (not shown) and the parison is then transferred to the mold cavity between the mold bodies 14, which are then closed by rotation of the aforementioned mold carriage arms.

Prior to insertion of the parison between the mold bodies 14, the said mold bodies 14 are supplied with water, such as by pipe 51 and nozzle 53 (FIG. 4). The water that is applied is absorbed in the porous structures of the metal mold bodies 14. The conventional means of water supply may be utilized, such as is provided on a conventional revolving type glass forming machine indicated on FIG. 1 of U.S. Patent No. 1,156,009, to August Kadow, showing the paste molds being dipped into a reservoir of water. The water may alternatively be supplied by a spray directed against the glass working surfaces of the mold bodies 14 defining the molding cavity, such as is shown in U.S. Patent No. 2,744,358 to George E. Rowe.

The water thus supplied to the porous metal mold body 14 is absorbed throughout the void portions in the porous metal. As seen in FIG. 7, the void portions V form a net-work of interconnected voids occurring between the nodules N of powdered metal which have been fabricated to the shape of the mold body 14.

In the mold carriage 15 shown in FIG. 4, the mold body 14 is enclosed at its outer surface by metal backing portion 15a of the mold carrier 15. A further embodiment of mold carrier is shown in FIG. 5, in which a modified mold carriage 16, referred to generally at reference numeral 16, has its backing portion cut out to expose a portion of the outer surface of the mold body 14 to the atmosphere. This is demonstrated by the cut portions at 16, shown on FIG. 6. Inasmuch as the porosity caused by the voids V in the porous metal mold body 14 extend laterally therethrough, the dipping of the mold body 14 into the water supply (as taught in the above-referred to Kadow patent) will furnish water at the back surface of the mold body as well as at the glass working or interior surface of the mold body. Thus the voids V are completely and more rapidly filled with an adequate supply of water.

During shaping of the glass in the mold, the heat from the glass converts the water contained in the voids of the porous mold body 14 to steam, which provides a steam cushion between the glass undergoing working and the working surface of the mold cavity.

As demonstrated on FIG. 8, the central portion of the glass parison at the time it is inserted into the mold and the mold halves are closed has an internal temperature near its center of approximately 1900° F. Due to the cooling by radiation during formation and transfer of the parison, its skin temperature is decreased to approximately 1300° F. The steam cushion formed between the surface of the glass and the working surface of the molding cavity acts comparatively as an insulator between glass and the mold so that the temperature at the innermost portion of the steam cushion is, as indicated, approximately 1300° F. and at its outer portion a temperature of approximately 200° F. The heat insulating property of the steamed cushion is thus illustrated by the temperature differential of approximately 1100° F. existing through the thickness of the steam cushion. In contrast, the metallic portion of the mold body 14, whch is a relatively good conductor of heat, has a resultant temperature differential of approximately 100° F., evidenced by the internal surface temperature of 200° F. compared to the external surface temperature of approximately 100° F. These latter temperatures may, of course, be varied by the thickness of the mold body 14 and coolant circulated at its outer surface. The steam cushion provides an insulating characteristic in the glass shaping tool to set up the glass more slowly, that is this cushion transfers heat away from the glass undergoing shaping more slowly. This heat insulation contributes directly to the improved quality of the finish on the glass produced.

It has been found that, if the porosity of the mold body 14 is too great, the steam formed tends to be depressed into the pores and recondensed to water which decreases the thickness of the steam cushion, and thereby decreases its insulating characteristics. In this connection, the nodular size of the metal powder used in fabricating the mold structure determines the porosity and consequently controls the degree of steam cushioning. The range in size of nodules of powdered metal used, as previously mentioned herein, produces porosity in the mold that will produce high quality glass finishes.

The prior paste compositions used heretofore for lining paste molds have their limits in water absorption and retention properties. This is believed to be a decided disadvantage in the paste mold operation, in that if the water which is absorbed by the mold converts entirely to steam prior to the completion of the forming cycle, the steam cushion tends to diminish during forming until it has almost entirely disappeared at the end of the forming cycle. This accelerates the rate of setting up the glass. On the other hand, this invention provides a means of making an increased amount of water available for creating the steam cushion during the forming cycle. By thus increasing the steam generating characteristics of the mold, the forming operation is accordingly improved to give a resultant improved luster and finish to the finished glassware.

The degree of porosity occurring in the metallic mold body 14 may be varied from one portion to another to give controlled porosity at selected portions of the mold. This is accomplished by varying the size of powdered metal constituent during filling the mold. For example, if the porosity is desired to be greater near the lower zone of the mold, a larger mesh powdered metal, such as minus 60 or minus 100 mesh, will be first poured into the pattern mold 10 (FIG. 1). The latter formed portions of the article may then be filled by a like metal powder of smaller mesh size, such as minus 120 or minus 150 resulting in a lesser porosity in that corresponding zone of the formed article.

The zones of different porosity are indicated on FIG. 5, as bracketed portions of L, M and N. Various combinations of porosity and wall thickness may be provided to give a temperature regulated means for controlling glass distribution and wall thickness within the mold 14. By empirically adjusting the porosity and wall thickness of the mold, as per the above suggested fabricating procedure, provides a means for obtaining different rates of heat exchange to correspond with different thicknesses of glass at selected areas of the glass article being formed, which may thereby obtain a uniform rate of cooling for the glass wall whereat differences in thickness occur.

As a further refinement of the present invention, the strength characteristics of the mold body may be greatly impoved by additionally plating the porous metal portion of the mold body halves 14 with a metallic alloy possessing greater strength and polish characteristics.

While working glass, the abrasive action of the glass at elevated temperatures tends to wear the molding cavity of the mold body 14. When the cavity has worn beyond the dimension tolerances for the glassware article, the molds must be taken off and refinished or replaced. Although the operating life of the porous metal mold, above described, has been found to be upwards of four times that of a paste composition mold, the porous metal of the composition mentioned herein, may be the inclusion of a metal plating applied to its glass working surfaces, have its strength and resultant wear resistance increased.

For this variant of the invention, therefore, the finished porous metal mold body 14, after casting in the pattern mold and sintering as previously described, is placed in a bath of nickel plating solution and plated to the desired depth. It is preferred that a particular type of nickel plating process be utilized, namely, the autocatalytic chemical reduction process for plating nickel as disclosed in detail in U.S. Patent No. 2,532,283, to Abner Brenner et al., entitled "Nickel Plating by Chemical Reduction." Plating by this process allows the alloy to plate over the nodules of metal of the porous metal mold body extending into the voids, but not sufficient to close the voids or shut off the net-work of porosity formed thereby.

In this process, the mold body 14 is submersed in a bath containing, as plating constituents, nickel chloride or nickel sulphate mixed with sodium hypophosphite. The bath is maintained at a temperature in the range of between 185 and 195° F. The plating bath is maintained as an acid solution. The depth of plating varies with the time of submersion in the bath. The resultant plating deposited by the aforementioned solution is a nickel-phosphorus alloy in which the phosphorus content ranges between 7 and 13%. The plated nickel-phosphorus alloy, in addition to increasing the strength of the porous metal article, has excellent oxidation resistance and is a good conductor of heat.

After the mold body 14 is plated and removed from the bath, it is given a water rinse and air dried. At this point, if tested on a Rockwell hardness machine, the plated surface will measure a hardness of 45 to 50 $R_c$. This surface hardness may be improved, however, by then placing the mold body 14 in a furnace for heat treatment for one hour at a temperature of 750° F., whereupon it is removed and cooled in air. The measured surface hardness, as gauged on a Rockwell hardness machine, will increase to approximately 60 $R_c$. The plating and hardening treatments of the material will not effect the wetability or water absorption characteristics of the porous metal mold body, yet it is an economical treatment and capable of increasing the mold body life and wearability, as well as increase its heat transfer properties. The nickel plated coating tends to give the molding surface portion of the mold body a slippery feeling to the touch, and in turn provides excellent glass release properties at the glass working surface portion of the mold body should such be necessary in the forming operation.

Having described several embodiments of the invention, it should be understood that various other modifications may be resorted to without departing from the principles of the invention, which should be limited only by the scope of the claims.

I claim:

1. In a "paste" type glass molding apparatus for shaping molten glass into seamless, hollow articles, which includes a pair of opposed mold holder members mounted for movement toward and away from each other in a molding position about a mold bottom, and a pair of complementary mold halves defining in juxtaposed relationship the mold side walls of a symmetrical article shaping cavity, the improvement wherein said mold halves are comprised of particles of metal bound together in the form of a self-supporting and durable porous structure for blow molding glass, said structure having interconnected solids and defining interconnected capillary voids, the volume of the solids of said structure being always in excess of the volume of the voids thereof, the dimensions of the metal particles being not in excess of 60 mesh size so that the voids are of capillary dimension and as such define capillary passages extending through the said mold side walls, means for mounting said mold halves on said mold holder members for opening and closing said mold halves in glass molding position, and means for supplying water to the side walls of said mold to fill said capillary passages, said water being movable through the capillary passages and onto the article shaping side wall of said structure, the heat transferred from the glass undergoing shaping converting said water to steam adjacent the said porous metal shaping side wall surface of said juxtaposed mold halves providing the steam cushion between said glass during shaping and said porous metal shaping side wall surface.

2. The molding apparatus defined by claim 1, wherein the dimensions of the metal particles are within the range of from 150 mesh to 60 mesh size.

3. The molding apparatus defined by claim 2, wherein the size of capillary passages extending through the said mold side walls is varied longitudinally along the article shaping cavity.

References Cited by the Examiner

UNITED STATES PATENTS

| | | | |
|---|---|---|---|
| 958,613 | 5/1910 | Forgo | 65—25 |
| 2,395,727 | 2/1946 | Devol | 65—26 |
| 2,478,090 | 8/1949 | Devol | 65—25 |
| 2,555,712 | 6/1951 | Smith | 65—26 |
| 2,744,358 | 5/1956 | Rowe | 65—360 |

DONALL H. SYLVESTER, *Primary Examiner.*

D. CRUPAIN, *Assistant Examiner.*